Sept. 25, 1951 G. R. BROWN 2,568,986
FISHLINE REEL
Filed Sept. 18, 1947
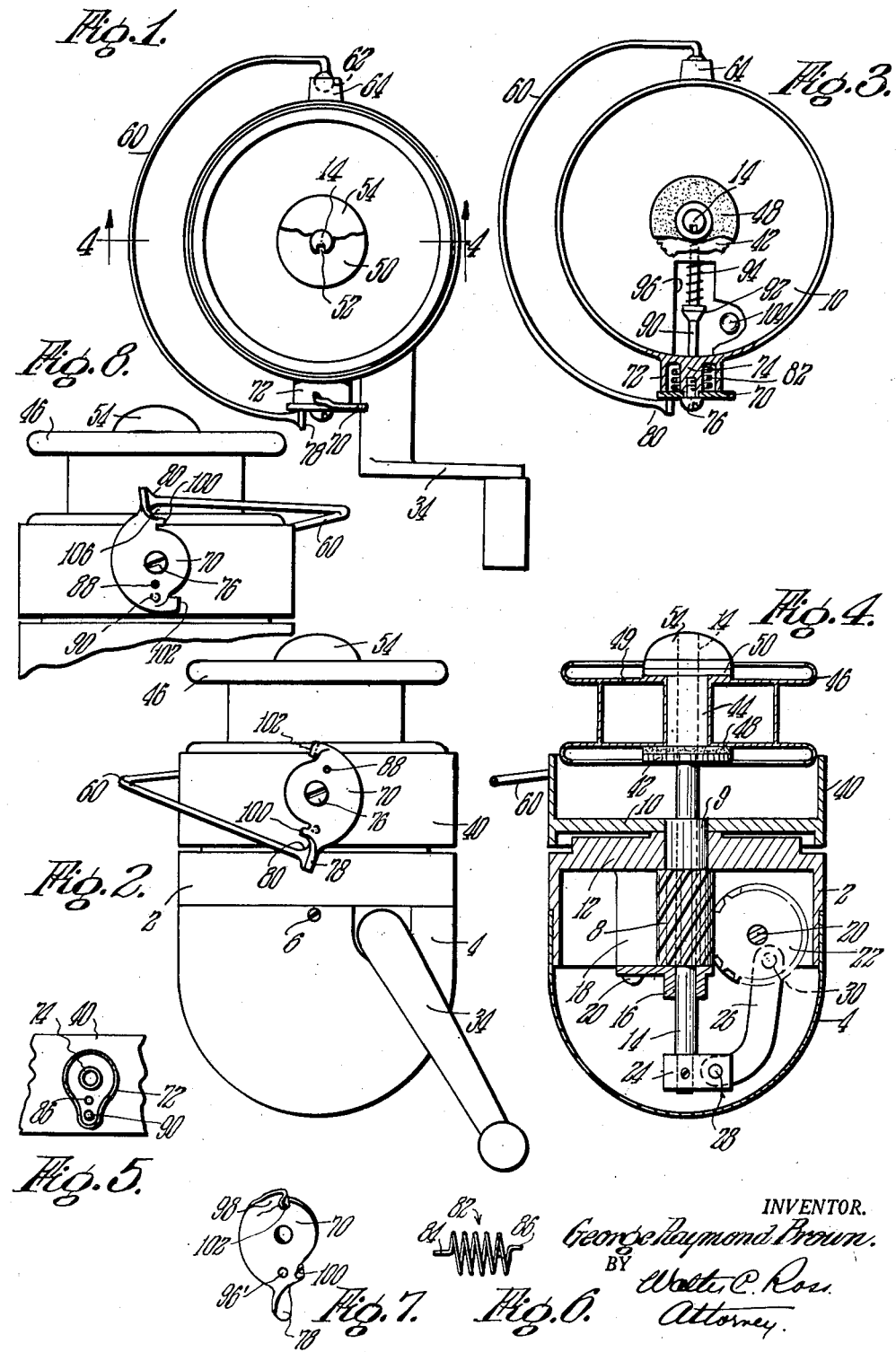
INVENTOR.
George Raymond Brown.
BY Walter C. Ross.
Attorney.

Patented Sept. 25, 1951

2,568,986

UNITED STATES PATENT OFFICE 2,568,986

FISHLINE REEL

George Raymond Brown, Springfield, Mass.

Application September 18, 1947, Serial No. 774,839

1 Claim. (Cl. 242—84.4)

This invention relates to fish line reels, and this application is a continuation in part of an application Ser. No. 727,395 filed by me on February 8, 1947.

The principal object of the invention is the provision of a fish line reel which is adapted for association with a fish rod or pole and is particularly adapted for casting a line.

The reel of the invention is characterized by a novel combination and arrangement of parts arranged and adapted to facilitate ready and easy casting of a line as well as the reeling in of the line. In reeling in the line, the line is guided onto a spool by a guiding means which, in the operation of the device is automatically moved from a casting to a guiding position while the said means is manually movable from a guiding to a casting position.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of a reel device embodying the novel features of the invention;

Fig. 2 is a side elevational view of the reel device shown in Fig. 1;

Fig. 3 is a plan view of the reel device shown in Figs. 1 and 2 with the spool component thereof removed therefrom;

Fig. 4 is a vertical sectional elevational view taken substantially on the line 4—4 of Fig. 1;

Fig. 5 is an elevational view of a portion of the flyer of the reel device;

Fig. 6 is an elevational view of a spring used in connection with the device;

Fig. 7 is a perspective view of a lever of the device; and

Fig. 8 is a partial side elevational view of the reel device with the guide in the guiding position.

Referring now to the drawings more in detail, the invention will be fully described.

A housing 2 is provided which is cup-shaped in form as shown in Fig. 4 and a cover or closure 4 is removably secured to the lower end thereof by means of one or more screws 6 extending therethrough and in threaded engagement with the housing.

A spiral gear 8 has an upper hub portion 9 which is rotatable in an upper wall 12 of the housing. A stem or drive shaft 14 is reciprocable in a bearing 16 which is secured to a boss 18 of the housing by means of a screw or screws 20, and is also reciprocable in said spiral gear 8. The lower end of the spiral gear 8 may also be journalled in the bearing 16, if desired.

An operating shaft 20' is rotatable in the housing on an axis opposed to the axis of the shaft 14 and it has fixed thereto a spiral gear 22 which is in mesh with the gear 8. A block 24 is secured to the lower end of shaft 14 and a link 26 is pivoted at 28 thereto and at 30 to the spiral gear 22. A crank 34 is fixed to the shaft 20' and as the crank is manually rotated, said shaft 20' is rotated and through the gear 22 the gear 8 is rotated. Thereby, through the link 26, the shaft 14 is moved up and down simultaneously with the rotation of gear 8.

A flyer 40 is fixed to hub 9 of gear 8 and is cup-shaped as shown. A serrated disc 42 is fixed to the shaft 14 and it has a hub 44 extending upwardly therefrom. A spool 46 is rotatable on the hub 44 and a resilient washer 48, which may be of felt or the like, is disposed between the lower side of the spool 46 and the disc 42, as shown in Fig. 4.

A washer 50 is arranged to bear on the upper side 49 of the spool 46 and it has a tongue or key 52 disposed in a key-way at the upper end of shaft 14 as shown in Fig. 1. A nut 54 is in threaded engagement with the upper end of the shaft 14. By adjusting the nut up and down, more or less drag is exerted against rotation of the spool as may be desired.

The spool 46 is rotatable on the hub 44 subject to the influence of the frictional device just described, said frictional device being adapted to offer resistance to the rotation of the spool when a line therearound is cast.

As stated, the disc 42 has a peripheral serrated edge and a resilient member may be associated with adjacent parts and in engagement therewith so that as the spool rotates the member will click in the serrations similarly as in the construction shown and described in my pending application above referred to. As stated, the flyer 40 is fixed to the hub of the gear 8 so as to be rotated thereby.

The spool, being associated with the shaft 14 as described, is moved up and down relative to the flyer so that in winding a line onto the spool it is moved up and down relative to the flyer while the flyer is rotated.

It will be pointed out here that the crank 34 may be located on either side of the housing and will depend on whether it is desired to operate the crank with the right or left hand.

A guide line 60, preferably of wire, is formed more or less, as shown, and one end thereof carries a ball 62 which is rotatable in a socket 64 at one side of the flyer 40. A lever member 70 is provided at the opposite end of the guide and a hollow hub 72 projects outwardly from the opposite side of the flyer. A boss 74 in the hollow hub is tapped to receive a screw 76. The member 70 is journalled on the hub and the screw 76 holds the member 70 so that it may oscillate back and forth.

The guide 60 which has one end pivoted to the flyer by means of the ball 62 has its other end fixed to an ear 78 of the member 70, and is provided with a curvature or fillet 80 (see Fig.

2). In this way the guide is connected at opposite ends to the flyer for swing movements.

The boss 72 receives a spring 82, such as shown in Fig. 6, and an end 84 of said spring is receivable in a hole 86 in the flyer 40. With the spring in the boss, an opposite end 86 of the spring is received in a hole 88 of the member 70. Said spring 82 being thus connected to the flyer, the member 70 is urged in a clockwise direction.

From the casting position of the flyer 40, as shown in Fig. 2, it swings to the guiding position shown in Fig. 8 wherein the guide guides the line onto the reel. This swinging movement is brought about by the spring 82. A plunger 90 (see Fig. 3) is guided in the flyer for movements in and out radially thereof and it has a cam member 92 fixed thereto and a spring 94 therearound rearwardly of the cam. The member 90 is disposed in a slot 96 of a wall 10 of the flyer. The member 70 has a hole 96' on its inner side to receive the outer end of the member 90 and an inwardly extending cam portion 98 which is adapted to engage and bear on the outer end of the member 90 to move it inwardly against the spring 94. An inwardly extending ear 100 on the member 70 prevents counterclockwise movement of the member 70 beyond the casting position of the guide shown in Fig. 2. That is, the ear 100 is adapted to abut a side of the lower portion of the hub 72 and prevent further counterclockwise movement of the member 70. Another inwardly extending ear 102 on the member 70 is adapted to abut an opposite side of the lower portion of the hub 72 and prevent movement of the member 70 clockwise beyond the line guiding position of the guide 60 as shown in Fig. 8.

The guide 60 is shown in the casting position in Fig. 2. It will be understood that the device may be secured to a fishing rod or the like in any convenient manner such as by means of the bracket shown in the above referred to application.

With the guide 60 in the casting position shown in Fig. 2, and with the line wound on the reel and extending therefrom, the line may be cast as may be desired. When it is desired to reel in the line, the crank is turned so that gear 22 rotates the gear 8 which in turn rotates the flyer 40 while at the same time the shaft 14 is reciprocated up and down through the link 26. As the flyer is rotated in this way, and the spool is moved up and down relative thereto, the cam 92 of rod 90 brings up against an abutment or cam 104 provided on the upper side of the housing so that the rod is moved inwardly against the action of the spring 94. The outer end of the rod is removed from the hole 96' of member 70 and the spring 82 swings the member 70 and thereby the guide 60 from the casting position shown in Fig. 2 to the guiding position shown in Fig. 8. That is, the guide 60 swings over the line which extends from the reel so that the line then is between the guide and upper side of the flyer. The spool being moved up and down relative to the flyer which is being rotated, the line is guided by the fillet 80 onto the spool.

The simultaneous rotation of the reel and reciprocation of the spool brings about the desired serving or winding of the line onto the spool and the guide is automatically moved to a guiding position when the crank is rotated for taking in the line.

When the guide swings to a guiding position, the cam face 98 of member 70 acting on rod 90 moves said rod inwardly beyond a point where members 92 and 104 engage as the flyer rotates so that the flyer is free to rotate for winding up of the line.

When the line has been wound up, the guide may be manually swung from a guiding to a casting position against the action of the spring 82.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A fishline reel construction for association with a fishing rod comprising in combination, a housing adapted to be secured to a fishing rod, an operating shaft rotatable relative to said housing, a stem reciprocable in said housing longitudinally on an axis opposed to the axis of rotation of said operating shaft, operative connections between said operating shaft and stem for reciprocating said stem by rotation of said operating shaft, a flyer rotatable relative to said housing, means connecting said operating shaft and flyer for rotating said flyer by rotation of said operating shaft, a line-carrying spool engageable on said stem and reciprocable therewith as said stem reciprocates in longitudinal movements relative to said housing and flyer, a guide member, connecting means at opposite ends of said guide member pivotally connecting said guide member to opposite sides of said flyer for movement of said guide member between line-casting and guiding positions relative to said flyer, a straight plunger reciprocable radially in said flyer and having an outer free end for releasably engaging one of said connecting means at an end of said guide member and holding said guide member in the line-casting position, the said one of said connecting means having an opening disposed to receive the outer end of said plunger, spring means urging said plunger outwardly, a cam carried directly on said plunger, cam means fixed to said housing positioned to engage said first mentioned cam and actuate said plunger and releasing said guide member from the line-casting position upon rotation of said flyer, and means for movement of said guide member from line-casting to guiding position upon release from the line-casting position, all adapted and arranged whereby upon rotation of said operating shaft said guide member is swung from a line-casting to a guiding position for accomplishing a line-winding operation.

GEORGE RAYMOND BROWN.

REFERENCES CITED

The following references are of record in the file of this patent:

FOREIGN PATENTS

| Number | Country | Date |
|---|---|---|
| 373,786 | Great Britain | June 2, 1932 |
| 380,939 | Great Britain | Sept. 29, 1932 |
| 887,877 | France | Aug. 23, 1943 |
| 888,145 | France | Aug. 30, 1943 |